United States Patent
Faigle et al.

(10) Patent No.: US 6,206,416 B1
(45) Date of Patent: Mar. 27, 2001

(54) VEHICLE SAFETY SYSTEM

(75) Inventors: Ernst M. Faigle, Dryden, MI (US); Dean M. Esterberg, Tempe, AZ (US); Timothy A. Swann, Mesa, AZ (US); Bryan W. Shirk, Mesa, AZ (US); Eric C. Erike, Mesa, AZ (US)

(73) Assignees: TRW Inc.; TRW Vehicle Safety Systems Inc., both of Lyndhurst, OH (US)

( * ) Notice: Subject to any disclaimer, the term of this patent is extended or adjusted under 35 U.S.C. 154(b) by 0 days.

(21) Appl. No.: 09/410,601

(22) Filed: Oct. 1, 1999

(51) Int. Cl.$^7$ .................................................. B60R 21/32
(52) U.S. Cl. ............................................. 280/735; 701/47
(58) Field of Search .................................... 280/735, 806; 701/47

(56) References Cited

U.S. PATENT DOCUMENTS

| | | |
|---|---|---|
| 3,767,002 | 10/1973 | Gillund . |
| 4,977,623 | 12/1990 | DeMarco . |
| 5,362,098 | 11/1994 | Guill . |
| 5,571,253 * | 11/1996 | Blackburn et al. ................... 180/282 |
| 5,624,132 | 4/1997 | Blackburn et al. . |
| 5,626,359 | 5/1997 | Steffens, Jr. et al. . |
| 5,658,011 * | 8/1997 | Byon ..................................... 280/735 |
| 5,670,853 | 9/1997 | Bauer . |
| 5,799,972 * | 9/1998 | Handman et al. .................... 280/735 |
| 5,979,935 * | 11/1999 | Van Wynsberghe et al. ........ 280/735 |

* cited by examiner

*Primary Examiner*—Lanna Mai
*Assistant Examiner*—Lynda Jasmin
(74) *Attorney, Agent, or Firm*—Tarolli, Sundheim, Covell, Tummino & Szabo L.L.P.

(57) ABSTRACT

A vehicle safety system (10) includes a first vehicle occupant safety device (50) including a first pyrotechnic device (60) that is electrically energizable in response to a first actuation signal (76). The system also includes a second vehicle occupant safety device (50) including a second pyrotechnic device that is electrically energizable in response to a second actuation signal (80). The system includes at least one sensor (14–28) for sensing a first occupant or vehicle condition and for providing a first output signal indicative of the sensed first condition. An electronic control unit (ECU) (30) receives the first output signal (14–28) and in response to the first output signal determines whether one or both of the first and second safety devices should be actuated. An radio frequency (RF) transmitter (40) electrically connected with the ECU (30) is selectively actuatable by the ECU to transmit first and second individually coded RF signals (72, 80). The system (10) includes a first RF receiver (64) electrically connected with the first safety device (50) for receiving the first individually coded RF signal (72) and for providing a first actuation signal (74) for energizing the first pyrotechnic device. The system (10) also includes a second RF receiver electrically connected with the second safety device for receiving the second individually coded RF signal (80) and for providing a second actuation signal for energizing the second pyrotechnic device.

9 Claims, 1 Drawing Sheet

(PRETENSIONER)
(AIR BAG INFLATOR)

VEHICLE SAFETY SYSTEM

BACKGROUND OF THE INVENTION

1. Technical Field

The present invention relates to a vehicle safety system that includes a plurality of electrically actuatable occupant safety devices located at different occupant seating positions in a vehicle.

2. Description of the Prior Art

A known vehicle occupant safety system includes a plurality of actuatable safety devices, such as air bag modules or seat belt pretensioners. The safety system also includes a plurality of sensors for sensing crash parameters and occupant condition parameters. The sensors and the actuatable devices are hard wired together along with other vehicle electric circuitry including an electronic control unit (ECU). Upon the occurrence of a vehicle event for which protection of one or more vehicle occupants may be desired, the ECU actuates selected ones of the plurality of safety devices, depending on the sensed parameters.

In this known type of safety system, a separate cabling harness is run from the ECU to each separate safety device. Such a cabling harness can possibly be cut in a vehicle accident, thus disabling the associated safety device. The cabling harnesses can add significant weight to a vehicle. The safety system also requires large and complicated harness connections at the ECU.

U.S. Pat. No. 5,171,253 describes a vehicle safety system including a crash sensor that energizes an radio frequency (RF) transmitter. The RF transmitter sends an RF signal to one or more RF receivers in the vehicle, each associated with an actuatable safety device. The RF signal actuates all the safety devices simultaneously. The system does not have the capability to actuate only selected ones of a plurality of separate safety devices.

SUMMARY OF THE INVENTION

The present invention is a vehicle safety system comprising a first vehicle occupant safety device including a first pyrotechnic device that is electrically energizable in response to a first electrical actuation signal. The system also comprises a second vehicle occupant safety device including a second pyrotechnic device that is electrically energizable in response to a second electrical actuation signal. The system comprises at least one sensor for sensing a first occupant or vehicle condition and for providing a first output signal indicative of the sensed first condition. An ECU receives the first output signal and in response to the first output signal determines whether one or both of the first and second safety devices should be actuated. An RF transmitter electrically connected with the ECU is selectively actuatable by the ECU to transmit first and second individually coded RF signals. The system comprises a first RF receiver electrically connected with the first safety device for receiving the first individually coded RF signal and for providing a first actuation signal for energizing the first pyrotechnic device. The system also comprises a second RF receiver electrically connected with the second safety device for receiving the second individually coded RF signal and for providing a second actuation signal for energizing the second pyrotechnic device.

In a preferred embodiment, the first RF receiver is part of a first RF transceiver that is operable to transmit individually coded information about the safety device to the ECU.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF A PREFERRED EMBODIMENT OF THE INVENTION

Figure 1:
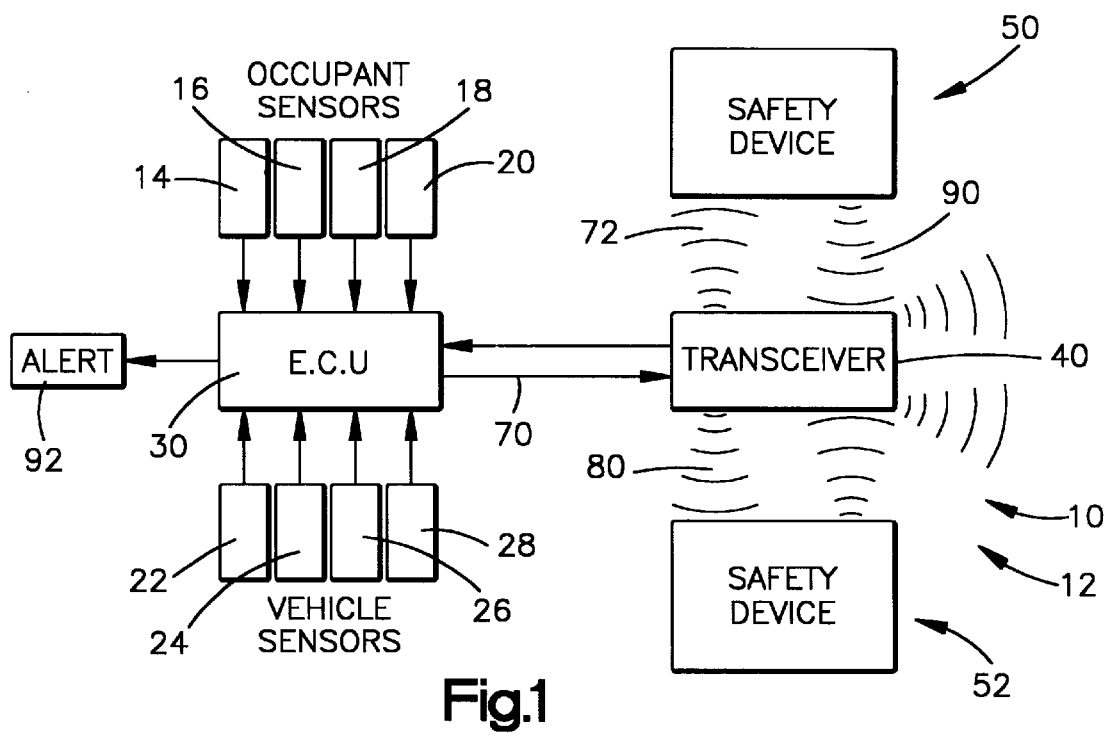
FIG. 1 is a functional block diagram of a vehicle safety system constructed in accordance with the present invention and including a plurality of safety devices.
Figure 2:
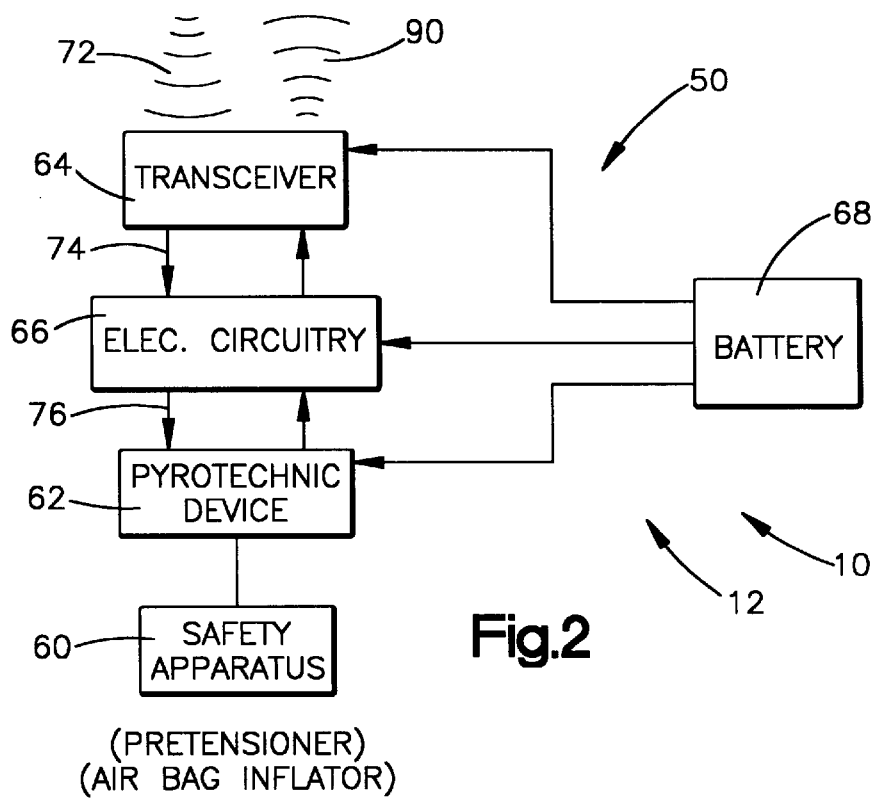
FIG. 2 is a functional block diagram of one of the safety devices of FIG. 1.

The present invention relates to a vehicle safety system. The present invention is applicable to various vehicle safety systems. As representative of the present invention, FIG. 1 illustrates schematically a safety system 10 for a vehicle 12.

The safety apparatus 10 includes one or more vehicle condition sensors 22, 24, 26 and 28. The vehicle condition sensors 22–28 are known devices operative to sense vehicle conditions such as sudden deceleration, an impact to the vehicle, or a rollover condition of the vehicle.

The safety apparatus also includes one or more occupant condition sensors 14, 16, 18 and 20. The occupant condition sensors 14–20 are known devices operative to sense occupant conditions such as size, weight, and/or position of the vehicle occupant.

One or more of the occupant sensors, for example the sensors 14 and 16, are associated with a first occupant seating position in the vehicle 12. Other ones of the sensors, for example the sensors 18 and 20, are associated with a second occupant seating position in the vehicle 12.

The safety apparatus also includes programmable vehicle electric circuitry including at least one electronic control unit (ECU) indicated schematically at 30. The ECU 30 is operative to receive and act on the output signals from the vehicle condition sensors and the occupant condition sensors. The ECU 30 is electrically connected with a primary transceiver 40. The primary transceiver 40 is a combination RF transmitter and receiver mounted in the vehicle 12.

The vehicle safety system 10 also includes at least two vehicle safety devices 50 and 52. A first safety device 50 helps to protect an occupant of the first occupant seating position in the vehicle 12, and the second safety device 52 helps to protect an occupant of the second occupant seating position in the vehicle. The two safety devices 50 and 52 are identical for purposes of the present invention and so only the first safety device 50 is described.

The first safety device 50 includes a safety apparatus 60, which is preferably a pretensioner or air bag inflator. Associated with the safety apparatus is a pyrotechnic device 62. The pyrotechnic device 62 is a known device that is electrically energizable and that, when energized, in turn actuates the safety apparatus 60. For example, if the safety apparatus 60 is an air bag inflator, the pyrotechnic device 62 may be an initiator which when electrically energized causes the air bag inflator to provide inflation fluid under pressure for inflating an air bag in the vehicle 12. Alternatively, if the safety apparatus 60 is a pretensioner, the pyrotechnic device when electrically energized causes the pretensioner to tension seat belt webbing to help protect an occupant in the first occupant seating position in the vehicle 12.

The first safety device 50 includes a secondary transceiver 64. The secondary transceiver 64 is an RF transmitter and receiver mounted adjacent to the safety apparatus 60 and the pyrotechnic device 62.

The first safety device 50 also includes electric circuitry 66 connected with the second transceiver 64 and the pyrotechnic device 62. The electric circuitry 66 is operable to receive the output of the secondary transceiver 64 and to energize the pyrotechnic device 62. The secondary transceiver 64, the electric circuitry 66, and the pyrotechnic device 62 are all powered by a battery 68. The battery 68 is preferably a long life battery, such as a lithium battery, located at the occupant seating position with which the first safety device 50 is associated.

Upon the occurrence of a vehicle event for which protection of an occupant of the first seating position may be desired, the vehicle condition sensors 22–28 provide appropriate output signals to the ECU 30. The occupant sensors 14 and 16 associated with the first occupant seating position also provide appropriate output signals to the ECU 30. Based on the output signals of the vehicle condition sensors 22–28 and the occupant sensors 14 and 16, the ECU 30 determines whether the safety apparatus 60 of the first safety device 50 should be actuated. Specifically, the ECU 30 compares the outputs of the various vehicle condition sensors 22–28 and occupant condition sensors 14 and 16 with outputs found in a look-up table, for example. Depending on the outcome of this comparison, the ECU 30 determines whether or not to actuate the safety apparatus 60. If the ECU 30 determines that the safety apparatus 60 should be actuated, a coded actuation signal 70 is sent by the ECU to the primary transceiver 40.

The primary transceiver 40 when thus energized transmits an individually coded RF signal 72 within the passenger compartment of the vehicle 12. The coded RF signal 72 is received by the secondary transceiver 64 of the first safety device 50. The secondary transceiver 64 sends a control signal 74 to the electric circuitry 66. The electric circuitry 66 decodes the control signal 74 and determines that actuation of the safety apparatus 60 is required. The electric circuitry 66 sends an actuation signal 76 to the pyrotechnic device 62. The pyrotechnic device 62 is energized and, in turn, actuates the safety apparatus 60.

While this is occurring, the occupant sensors 18 and 20 associated with the second occupant seating position provide appropriate output signals to the ECU 30. Based on the output signals, the ECU 30 determines whether the safety apparatus of the second safety device 52 should be actuated. If the ECU 30 determines that the safety apparatus of the second safety device 52 should be actuated, a coded actuation signal is sent by the ECU to the primary transceiver 40.

The primary transceiver 40 transmits an individually coded RF signal 80 within the passenger compartment of the vehicle 12. The signal 80 for the second safety device 52 is coded differently than the signal 72 sent for the first safety device 50. The coded RF signal 80 is received by the secondary transceiver of the second safety device 52. The secondary transceiver of the second safety device sends a control signal to its associated electric circuitry. The electric circuitry decodes the control signal and determines that actuation of the safety apparatus of the second safety device 52 is required. The electric circuitry of the second safety device 52 sends an actuation signal to its associated pyrotechnic device. The pyrotechnic device is energized and, in turn, actuates the safety apparatus of the second safety device 52.

The coded RF signal 72 for the first second safety device 50 and the coded RF signal 80 for the second safety device 52 are both transmitted through the entire passenger compartment of the vehicle 12. As a result, each one of the safety devices 50 and 52 receives both of the RF signals 72 and 80. Because the two RF signals 72 and 80 are individually coded and thus different, the electric circuitry of each one of the safety devices 50 and 52 is able to determine which signal requires a response. Any suitable number of vehicle occupant safety devices can be simultaneously actuated by the primary transceiver 40 because individually coded RF signals are employed.

Because the safety system 10 has the capability to send individually coded RF signals, such as the signals 72 and 80, the system need not actuate every safety device in the vehicle 12. Instead, the system 10 can actuate only those particular safety devices desired for a particular vehicle event. This can help to reduce replacement costs for actuated safety apparatuses. In addition, the wireless nature of the safety system 10 eliminates a substantial amount of wiring and connectors in the vehicle 12.

Because the primary transceiver 40 is a transceiver and not merely a transmitter, and because the secondary transceivers of the safety devices 50 and 52 are transceivers and not merely receivers, the vehicle safety system 10 can provide status interrogation capabilities. For example, the electric circuitry 66 of the first safety device 50 can check the operability status of the pyrotechnic device 62. This status can be communicated to the ECU 30 through an individually coded signal 90 sent from the secondary transceiver of the first safety device 50 to the primary transceiver 40. If the ECU 30 determines that the pyrotechnic device 62 is not properly operational, the ECU can send an alert signal to an alert device 92, such as a warning light on the vehicle instrument panel.

In the same manner, the electric circuitry of the second safety device 52 can check the operability status of its associated pyrotechnic device. This status can be communicated to the ECU 30 through an individually coded RF signal sent from the secondary transceiver of the second safety device 52 to the primary transceiver 40. If the ECU 30 determines that the pyrotechnic device is not properly operational, the ECU can send an alert signal to an alert device, such as a warning light on the vehicle instrument panel. Thus, upon vehicle start-up, each safety device 50 and 52 can perform a self-test, and its associated transceiver can sends an individually coded signal to the ECU 30. The ECU can actuate selected warning signals as needed.

From the above description of the invention, those skilled in the art will perceive improvements, changes and modifications in the invention. Such improvements, changes and modifications within the skill of the art are intended to be covered by the appended claims.

Having described the invention, we claim:

1. A vehicle safety system comprising:

a first vehicle occupant safety device including a first pyrotechnic device that is electrically energizable in response to a first electrical actuation signal;

a second vehicle occupant safety device including a second pyrotechnic device that is electrically energizable in response to a second electrical actuation signal;

at least one sensor for sensing a first occupant or vehicle condition and for providing a first output signal indicative of the sensed first condition;

an electronic control unit for receiving said first output signal and for determining in response to said first output signal whether one or both of said first and second safety devices should be actuated;

a primary radio frequency transmitter electrically connected with said electronic control unit and actuatable by said electronic control unit to transmit first and second individually coded radio frequency signals;

a first radio frequency receiver electrically connected with said first safety device for receiving the first individually coded radio frequency signal and for providing a first actuation signal for energizing said first pyrotechnic device; and a second radio frequency receiver electrically connected with said second safety device for receiving the second individually coded radio frequency signal and for providing a second actuation signal for energizing said second pyrotechnic device.

2. A safety system as set forth in claim 1 comprising a second sensor for sensing a second occupant or vehicle condition and for providing a second output signal indicative of the sensed second condition, said electronic control unit receiving said second output signal in addition to said first output signal and using said first and second output signals in determining whether one or both of said first and second safety devices should be actuated.

3. A safety system as set forth in claim 1 wherein said first vehicle occupant safety device comprises a first inflator, said first pyrotechnic device being an initiator for said first inflator.

4. A safety system as set forth in claim 1 wherein said first vehicle occupant safety device comprises a seat belt webbing pretensioner, said first pyrotechnic device forming a part of said pretensioner.

5. A safety system as set forth in claim 1 wherein said first radio frequency receiver is part of a first radio frequency transceiver for receiving said first individually coded radio frequency signal and for providing an actuation signal for energizing said first pyrotechnic device, said primary radio frequency transmitter being a transceiver, said first radio frequency transceiver also being operable to transmit individually coded information about said first safety device to said primary radio frequency transceiver and thereby to said electronic control unit;

said second radio frequency receiver being part of a second radio frequency transceiver for receiving the second individually coded radio frequency signal and for providing an actuation signal for energizing said second pyrotechnic device, said second radio frequency transceiver also being operable to transmit individually coded information about said second safety device to said primary radio frequency transceiver and thereby to said electronic control unit.

6. A safety system as set forth in claim 1 wherein each one of said first and second radio frequency transceivers is operable to transmit individually coded operational status information about its associated safety device to said electronic control unit.

7. A vehicle safety system as set forth in claim 1 wherein each one of said safety devices includes a respective battery for supplying electric power for said safety device.

8. A vehicle safety system comprising:

a plurality of vehicle occupant safety devices each including a respective pyrotechnic device that is electrically energizable in response to an electrical actuation signal, each one of said safety devices also including a respective secondary radio frequency transceiver for receiving an individually coded radio frequency signal and for providing an actuation signal for energizing the associated pyrotechnic device;

a plurality of sensors for sensing a plurality of different occupant and/or vehicle conditions and for providing output signals indicative of the sensed conditions;

an electronic control unit for receiving said output signals and for determining in response to said output signals whether each one of said safety devices should be actuated; and a primary radio frequency transceiver electrically connected with said electronic control unit and actuatable by said electronic control unit to transmit a plurality of individually coded radio frequency signals to said secondary radio frequency transceivers;

each one of said secondary radio frequency transceivers also being operable to transmit individually coded information about its associated safety device to said electronic control unit.

9. A vehicle safety system as set forth in claim 8 wherein each one of said safety devices includes a respective battery for supplying electric power for said safety device.

\* \* \* \* \*